Jan. 5, 1965         I. L. LOCKWOOD         3,163,955
RETRIEVER
Filed Oct. 15, 1963
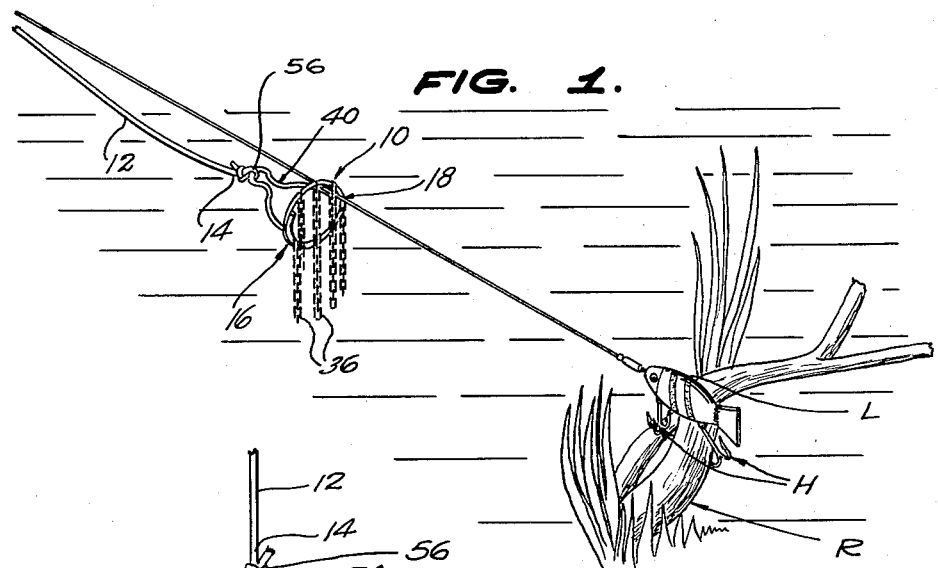
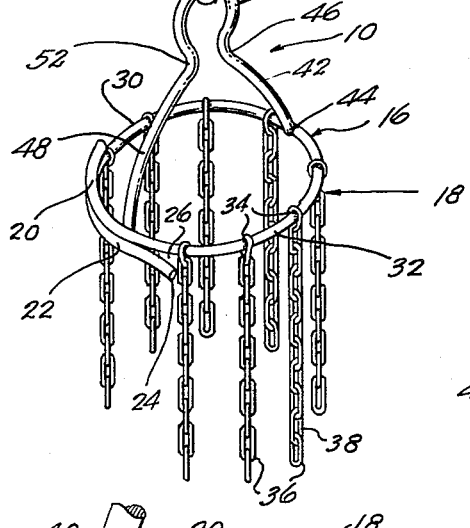
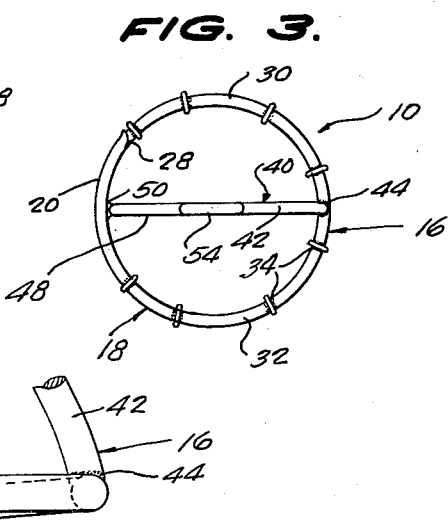
INVENTOR.
IVAL L. LOCKWOOD,
BY
McMorrow, Berman & Davidson
ATTORNEYS.

3,163,955
RETRIEVER
Ival Lee Lockwood, 361 4th St., Clifton, Colo.
Filed Oct. 15, 1963, Ser. No. 316,230
2 Claims. (Cl. 43—17.2)

This invention relates generally to retrieving apparatus, and more specifically to means for retrieval of fishing equipment snagged or entangled in submarine obstructions.

Various devices have been previously proposed for use in retrieving fishing lures ensnarled on underwater obstructions such as log, rocks, or the like, but such previous devices, due to bulk, cost, difficulty of manipulation, or other factors, have failed to find general acceptance. It is therefore an object of this invention to supply a device for the retrieval of objects of the type indicated, the main component of which is of minimum size readily carried in a fishing tackle box or the like, one of non-complex and inexpensive manufacture, made from readily available materials, and which is of extremely simple operation.

Another object of importance resides in the provision of a highly effective device for retrieving fishing lures, such as plugs, having multiple hook means thereon.

Another object is to provide a lure retriever employing a heavy rope, such as an anchor rope, as a component—which ropes are generally available on fishing boats without special provision.

Other and further objects and advantages of the present invention will become apparent to those skilled in the art from a consideration of the following specification when read in conjunction with the annexed drawing, in which:

FIGURE 1 is a perspective view showing apparatus constructed and assembled in accordance with the teachings of this invention and showing a fishing lure entangled on a submarine obstruction;

FIGURE 2 is an enlarged perspective view of the apparatus per se;

FIGURE 3 is a top plan view; and

FIGURE 4 is an enlarged, fragmentary view from the side of the line encircling ring means hereof.

Proceeding to a more detailed description of the invention, the retriever assembly 10 hereof comprises a heavy rope 12 or the like, such as an anchor rope, having a terminal end portion 14. The assembly 10 further includes a line and lure engagement means 16 comprising an annular main body portion or ring means 18 adapted to encircle a fishing line or the like, as described in more detail below. The body portion 18 is formed of metal or other heavy material adapted to sink in water and is of substantially cylindrical cross section. The body portion has overlapped upper and lower end portions 20 and 22. As best seen in FIGURES 2 and 4, the lower end portion terminates in a downwardly flared terminal section 24 providing a handle means 26. The upper end portion 20 terminates in a rounded end 28 whereby it is readily grasped for spreading of the portions if necessary.

The body portion includes opposite side portions 30 and 32 and a plurality of spaced apart loops 34 are secured about each portion at locations adapted to balance the body portion about a substantially central transverse axis when link chains 36, each including plural annular links 38, are secured to each loop.

An upstanding rope connection means 40 is provided, and includes a first upwardly and inwardly angled side arm 42 secured as by welds 44 to the body portion intermediate the sides 30 and 32 and having an upper end 46. Means 40 further includes a second upwardly and inwardly angled arm 48 secured by welds 50 to the lower end portion 22 at its inner side, the arm 48 terminating at an upper end 52. A loop 54 integrally connects the upper ends 46 and 52 of the arms 42 and 48.

As seen in FIGURES 1 and 2, the end 14 of rope 12 is engaged with the loop 54 as by knotting at 56.

An example of usage of the apparatus 10 is shown in FIGURE 1 wherein a fishing lure L with plural treble hooks H has become snagged on an underwater obstruction such as a root R. The lure L is connected to the fishing line F in the usual manner. The apparatus 10 is employed by manual placement of the body portion 18 about the line F, with the rope 12 secured to the loop 54 of the connection means 40. Engagement of the body portion 18 about the line F may be accomplished by placement of the line between the upper and lower end portions which are spread by inward or downward pressure on the lower end portion (applied either by pressing on the handle means 26 or inward pressure on the arm 48), the line passing between the end 28 and under the end portion 20. With the line thus encircled within the body portion, the device slides down the line and engages the lure L, the chain links 38 contacting and interengaging the loose hooks H by random manipulation. After the chains engage the hooks, the lure is withdrawn by pulling on the rope 12, which is not subject to breakage, and the lures either disengage without damage, or at the most, the hooks snagged in the obstruction R are straightened and the lures thereby freed.

The apparatus may also be used in retrieval of other items such as fishing rods, or the like, which may fall into the water during fishing.

While a specific embodiment of this invention has been shown and described herein in detail, it will be understood that this description and illustration is offered merely by way of example, and that the invention is to be limited in scope only by the appended claims.

What is claimed is:

1. A retriever assembly for retrieving a fishing lure with a plurality of hooks thereon, the fishing lure having at least one of the hooks thereof engaged in a submarine obstruction and being attached to a fishing line, the retriever comprising:
   (a) an annular body portion formed of metal of substantially cylindrical cross section;
   (b) the body portion having overlapped end portions including an upper end portion and a lower end portion;
   (c) the lower end portion being bent to provide a handle means to permit spreading of the end portions to place the line therebetween whereby the body portion is placed in encircling relation to the fishing line;
   (d) the body portion including side portions;
   (e) chain means, comprising a plurality of link chains secured to each side portion in spaced relation to one another and including links engageable with the hooks of said lure;
   (f) an upstanding rope connection means comprising one upwardly and inwardly angled arm secured to the body portion between said side portions and a second upwardly and inwardly angled arm secured to the lower end portion between the side portions adjacent the handle means, inward force on said second arm spreading the end portions;
   (g) a loop integrally connecting the arms; and
   (h) a heavy rope secured to the loop.

2. A retriever assembly for fishing equipment, the retriver assembly comprising:
   (a) an annular body portion;
   (b) the body portion having overlapped end portions including an upper end portion and a lower end portion;

(c) the lower end portion having handle means thereon to permit spreading of the end portions;

(d) the body portion including side portions;

(e) chain means, comprising a plurality of link chains secured to each side portion in spaced relation to one another and including links;

(f) an upstanding rope connection means comprising one upwardly and inwardly angled arm secured to the body portion between the side portions and a second upwardly and inwardly angled arm secured to the lower end portion between the side portions adjacent the handle means, inward force on said second arm spreading the end portions;

(g) a loop integrally connecting the arms; and (h) a heavy rope secured to the loop.

References Cited in the file of this patent
UNITED STATES PATENTS

| | | |
|---|---|---|
| 932,787 | Kirby | Aug. 31, 1909 |
| 1,412,011 | Bohm | Apr. 4, 1922 |
| 2,676,430 | Richard | Apr. 27, 1954 |
| 2,793,457 | Gaynes | May 28, 1957 |
| 2,801,489 | Gehring | Aug. 6, 1957 |